(12) United States Patent
Darolia

(10) Patent No.: US 6,273,678 B1
(45) Date of Patent: Aug. 14, 2001

(54) MODIFIED DIFFUSION ALUMINIDE COATING FOR INTERNAL SURFACES OF GAS TURBINE COMPONENTS

(75) Inventor: Ramgopal Darolia, West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/373,268

(22) Filed: Aug. 11, 1999

(51) Int. Cl.[7] ................................. F01D 5/28; F01D 9/04
(52) U.S. Cl. ................. 415/200; 416/229 A; 416/241 R; 416/241 B; 29/889.7; 427/181; 427/182; 427/454; 427/237; 427/252; 428/469; 428/472; 428/632
(58) Field of Search ..................... 415/200, 217, 415/1; 416/193 A, 224, 229 A, 230, 241 A, 241 B, 241 R; 29/889.7, 889.1; 427/454, 181, 182, 237, 252; 428/469, 472, 632

(56) References Cited

U.S. PATENT DOCUMENTS

| | | | |
|---|---|---|---|
| 4,087,589 | * 5/1978 | Bessen | 428/596 |
| 4,332,843 | * 6/1982 | Ahuja | 427/237 |
| 4,978,558 | * 12/1990 | Lamm | 427/250 |
| 5,264,245 | * 11/1993 | Punola et al. | 427/237 |
| 5,366,765 | * 11/1994 | Milaniak et al. | 427/229 |
| 5,702,288 | * 12/1997 | Liebke et al. | 451/36 |
| 5,788,823 | 8/1998 | Warnes et al. . | |
| 5,928,725 | * 7/1999 | Howard et al. | 427/237 |
| 6,110,262 | * 8/2000 | Kircher et al. | 106/14.44 |

\* cited by examiner

Primary Examiner—Christopher Verdier
(74) Attorney, Agent, or Firm—Andrew C. Hess; David L. Narciso

(57) ABSTRACT

An article is formed of a gas turbine component having a substrate, an internal passage through the substrate defining an internal surface of the substrate, and an internal protective layer overlying the internal surface of the substrate. The internal protective layer has a composition of aluminum, plus, in weight percent, on average from about 0.1 to about 5.0 percent of a modifying element selected from the group consisting of hafnium, yttrium, zirconium, chromium, and silicon, and combinations thereof, and elements found in the substrate.

19 Claims, 3 Drawing Sheets

MODIFIED DIFFUSION ALUMINIDE COATING FOR INTERNAL SURFACES OF GAS TURBINE COMPONENTS

FIELD OF THE INVENTION

This invention relates to a gas turbine component having an internal cooling passage, and, more particularly, to the protection of the surface of the internal passage of such a gas turbine component.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1800–2100° F.

Many approaches have been used to increase the operating temperature limit of the turbine blades and vanes to their current levels. For example, the composition and processing of the base materials themselves have been improved.

Physical cooling techniques may also be used. In one technique, internal cooling passages are located within the interior of the turbine component. Air is forced through the cooling passages and out openings at the external surface of the airfoil, removing heat from the interior of the airfoil and, in some cases, providing a boundary layer of cooler air at the surface of the airfoil. To attain maximum cooling efficiency, the cooling passages are placed as closely to the external surface of the airfoil as is consistent with maintaining the required mechanical properties of the airfoil, to as little as about 0.020 inch in some cases.

The surfaces of the internal cooling passages and the external surfaces of the turbine component may be protected with a protective coating. Aluminide diffusion coatings are used for the internal surfaces, and aluminide diffusion coatings or overlay coatings are used on the external surfaces. A ceramic layer may also overlie the protective coating on the external surfaces. Although these internal and external protective layers provide improved resistance to environmental damage of the turbine component and the ability to operate at higher temperatures, there is an opportunity for improvement. Thus, there is a need for improved protective coating systems that extend the capabilities of the turbine components even further. The present invention fulfills this need, and further provides related advantages.

BRIEF SUMMARY OF THE INVENTION

The present invention provides an article and a method for its preparation. The article is preferably a component of a gas turbine having internal passages therein, such as the passages that channel a flow of cooling air through the component. The present approach increases the environmental resistance of the internal surfaces that form the internal passages, thereby increasing their durability. The improved environmental resistance is achieved using a modification of an existing, well-proved technology. The present approach is specific to the protection of internal surfaces, but it may be utilized in conjunction with any approach for protecting the external surfaces.

An article comprises a gas turbine component having a substrate, an internal passage through the substrate defining an internal surface of the substrate, and an external surface of the substrate. An internal protective layer overlies the internal surface of the substrate. The internal protective layer has a composition comprising aluminum, plus, in weight percent, on average from about 0.1 to about 5.0 percent of a modifying element including hafnium, yttrium, zirconium, chromium, and/or silicon, and combinations thereof.

A related method for preparing an article comprises the steps of providing a substrate having an internal passage therethrough defining an internal surface of the substrate, depositing a layer onto the internal surface comprising aluminum and a modifying element selected from the group consisting of hafnium, yttrium, zirconium, chromium, and silicon, and combinations thereof, and heating the layer comprising aluminum and the modifying element so that the aluminum and the modifying element diffuse into the substrate. The diffused material forms an internal protective layer having an average composition of from about 16 to about 30 weight percent aluminum, from about 0.1 to about 5.0 weight percent of the modifying element, and other elements interdiffused from the substrate.

The gas turbine component is preferably a gas turbine blade or gas turbine vane, with internal cooling passages. Such an article is typically made of a nickel-base superalloy. In most cases, an external protective layer in the form of a diffusion aluminide or an overlay coating is also used, optionally with the application of a ceramic layer to form a thermal barrier coating.

The present invention is used solely in conjunction with the internal surfaces of the gas turbine component and to protect these internal surfaces. The protection of the internal surfaces poses a substantially different problem than the protection of the external surfaces of the gas turbine component. The internal surfaces are usually formed by small internal passages, that are typically from about 0.1 inch to about 0.5 inch in diameter. The internal surfaces are not accessible to many types of coating techniques, such as those employing line-of-sight deposition processes. The protective layer on the internal surfaces cannot be readily repaired, and therefore must last longer than the protective layer on the external surfaces, which can be refurbished. Additionally, the internal surfaces are subjected to a significantly different service environment than the external surfaces. The external surfaces experience hot corrosion, hot oxidation, and erosion in the combustion gas. On the other hand, a flow of bleed air from the engine compressor, not combustion gas, is passed through the internal passages, and the internal surfaces are at a lower temperature than the external surfaces. The bleed cooling air typically contains salt, sulfur, and other corrodants drawn into the compressor of the engine. The presence of the combination of salt and sulfur at a temperature in the range of about 1300° F., a typical temperature for the internal surfaces, may lead to severe Type II hot corrosion on the internal surfaces. The internal surfaces of the internal passages are additionally subjected to low-to-medium temperature oxidation. The internal surfaces of the gas turbine components are thus subjected to environmental damage of a type substantially different from that experienced on the external surfaces.

The present approach provides an internal protective layer tailored to the requirements of the internal surfaces of the gas turbine component. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
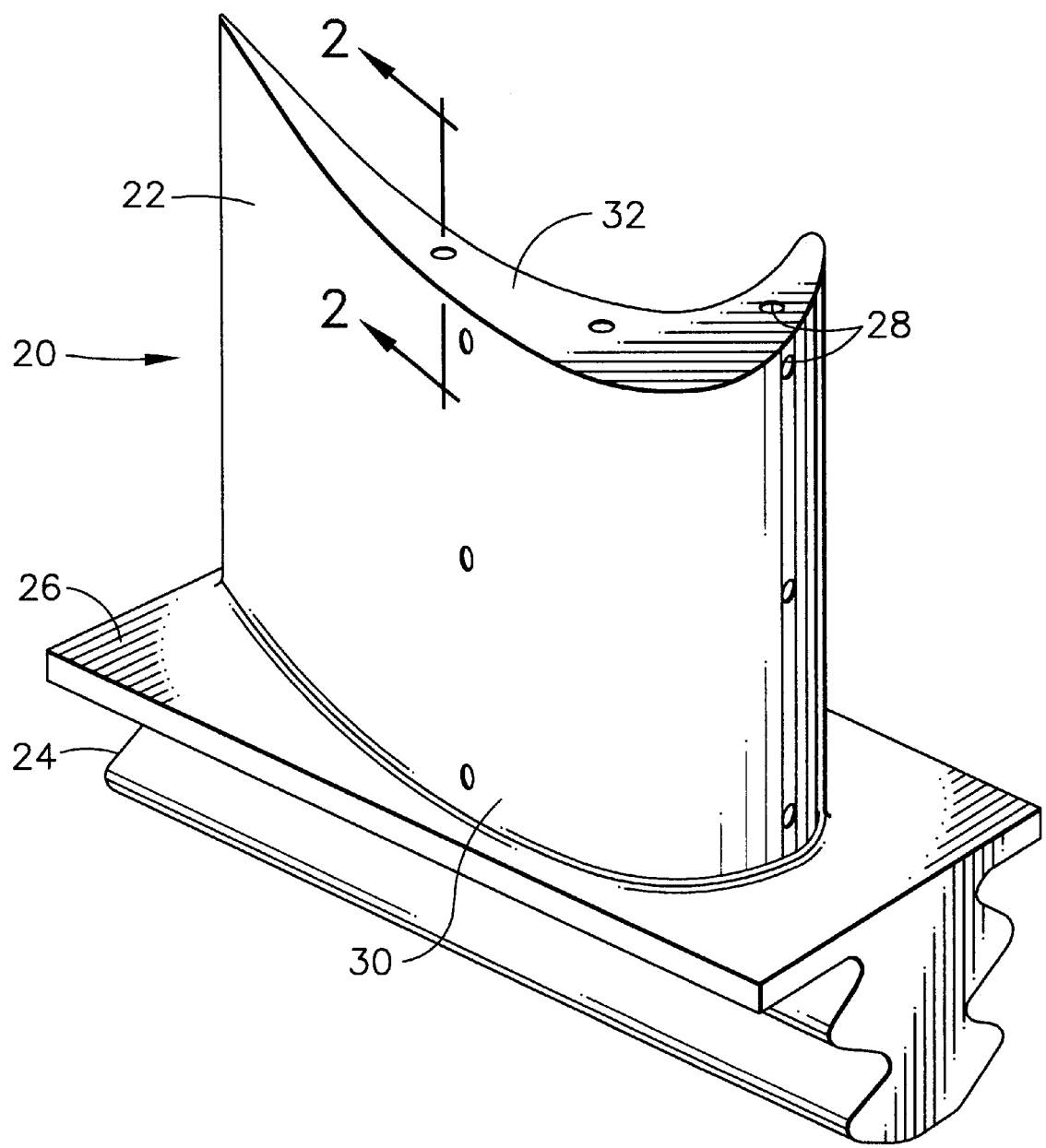
FIG. 1 is a perspective view of a turbine blade.

FIG. 1 depicts a component article of a gas turbine engine such as a turbine blade or turbine vane, and in this illustration a turbine blade 20. The turbine blade 20 is formed of any operable material, but is preferably a nickel-base superalloy. The turbine blade 20 includes an airfoil 22 against which the flow of hot exhaust gas is directed. (The turbine vane has a similar appearance in respect to the pertinent portions.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of internal passages extend through the interior of the airfoil 22, ending in openings 28 in the surface of the airfoil 22. A flow of cooling air is directed through the internal passages, to reduce the temperature of the airfoil 22. The airfoil 22 may be described as having a root end 30 adjacent to the dovetail 24, and an oppositely disposed tip end 32 remote from the dovetail 24.

Figure 2:
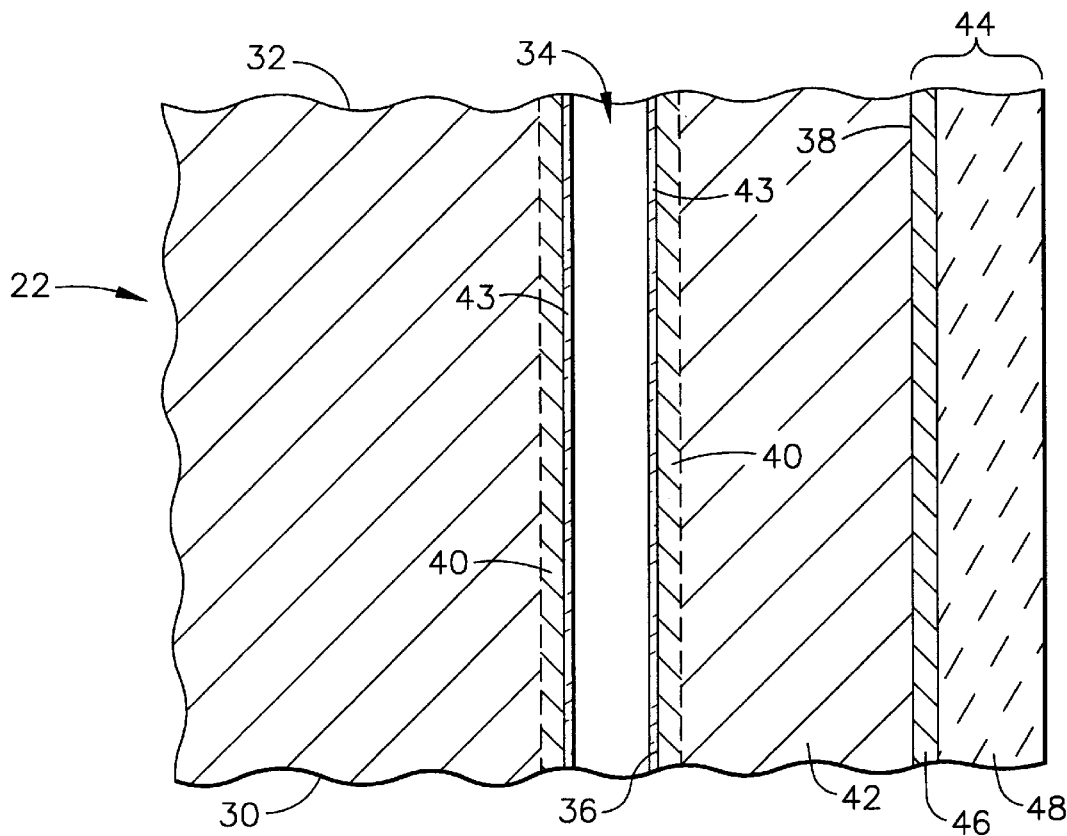
FIG. 2 is an enlarged schematic sectional view through the turbine blade of FIG. 1, taken on lines 2—2.

FIG. 2 is a longitudinal section through the airfoil 22, showing one of the internal passages 34 extending through an interior of the airfoil 22. The internal passage 34 has an internal airfoil surface 36, and there is also an external airfoil surface 38 of the metallic portion of the airfoil 22.

A diffusion aluminide internal protective layer 40 is present at the internal airfoil surface 36. The diffusion aluminide is formed by depositing a coating comprising aluminum and a modifying element onto the internal airfoil surface 36, so that a body of the airfoil 22 serves as a substrate 42, and thereafter interdiffusing the coating with the alloy of the substrate 42. During this processing, a separate step, and/or service of the component article at elevated temperature, the aluminum-enriched internal airfoil surface 36 is oxidized to form a protective aluminum oxide layer, sometimes termed a "scale". This protective aluminum oxide layer inhibits and slows subsequent corrosion and oxidation damage at the internal airfoil surface 36.

The modifying element is hafnium, yttrium, zirconium, chromium, or silicon, or combinations thereof. The modifying element is present, on average, in an amount of from about 0.1 to about 5.0 weight percent of the diffusion aluminide internal protective layer 40. The presence of the modifying element achieves improved performance of the diffusion aluminide internal protective layer 40, primarily by improved adherence of the protective aluminum oxide to the internal surface of the substrate. These modifying elements are believed to achieve the improved adherence by providing "peg" to anchor the protective aluminum oxide to the surface of the substrate, and in some cases by improving the strength of the interface between the protective aluminum oxide and the substrate 42, although the operability of the invention is not dependent upon these possible explanations. If the amount of the modifying element is, on average, less than about 0.1 weight percent, it is ineffective in achieving improved performance of the diffusion aluminide internal protective layer 40, as compared with an otherwise similar diffusion aluminide which does not contain the modifying element. If the amount of the modifying element is, on average, greater than about 5.0 weight percent of the diffusion aluminide internal protective layer 40, there is a risk of adverse effects on the environmental properties of the diffusion aluminide internal protective layer 40 and of the metallurgical properties of the substrate 42.

Preferably, but not necessarily, the average aluminum content of the diffusion aluminide internal protective layer 40 is from about 16 to about 30 percent by weight. If the average aluminum content is less than about 16 percent by weight of the diffusion aluminide internal protective layer 40, the protective oxide is not formed properly. If the average aluminum content is greater than about 30 percent by weight of the diffusion aluminide internal protective layer 40, the coating may become brittle and can, in turn, initiate cracking of the substrate. The remainder of the diffusion aluminide internal protective layer 40, which is not aluminum and not the modifying element, is elements that are interdiffused into the diffusion aluminide internal protective layer 40 from the substrate 42, primarily nickel.

The aluminum and the modifying element are interdiffused with the material of the substrate 42 to form the internal protective layer 40, which is enriched in aluminum and the modifying element, lying at and below the internal airfoil surface 36. The diffusion aluminide internal protective layer 40 has a composition with the aluminum and modifying element concentrations highest near the internal airfoil surface 36, and decreasing aluminum and modifying element concentrations with increasing distance into the substrate 42 from the internal airfoil surface 36. The diffusion aluminide internal protective layer 40 is typically from about 0.0005 to about 0.004 inch thick. Because of this variation in composition, the compositions are stated in terms of averaged values. The composition is averaged over this thickness of the diffusion aluminide internal protective layer 40.

When exposed to a high-temperature oxidizing environment, the diffusion aluminide internal protective layer 40 at the internal airfoil surface 36 oxidizes to form a highly adherent aluminum oxide ($Al_2O_3$) protective scale 43 at the internal airfoil surface 36, inhibiting and slowing further oxidation damage. An overlay coating such as discussed next and applied to the external airfoil surface 38 is not used on the internal airfoil surface 36.

The external airfoil surface 38 may also be protected, and FIG. 2 illustrates one approach. An overlay protective coating 44 overlies and contacts the external airfoil surface 38. The overlay protective coating 44 has a protective layer 46 overlying and contacting the external airfoil surface 38. The protective layer 46 is preferably formed of an MCrAlX composition. The terminology "MCrAlX" is a shorthand term of art for a variety of families of overlay protective layers 46 that may be employed as environmental coatings or bond coats in thermal barrier coating systems. In this and other forms, M refers to nickel, cobalt, iron, and combinations thereof. In some of these protective coatings, the chromium may be omitted. The X denotes elements such as hafnium, zirconium, yttrium, tantalum, rhenium, platinum, silicon, titanium, boron, carbon, and combinations thereof. Specific compositions are known in the art. Some examples of MCrAlX compositions include, for example, NiAlCrZr and NiAlZr, but this listing of examples is not to be taken as limiting. The protective layer 46 is preferably from about 0.0005 to about 0.005 inch thick. Such protective layers 46 are generally known in the art, although specific compositions may not be known.

Optionally, a ceramic layer 48 overlies and contacts the protective layer 46. The ceramic layer 48 is preferably yttria-stabilized zirconia, which is zirconium oxide containing from about 2 to about 12 weight percent, preferably from about 4 to about 8 weight percent, of yttrium oxide. The ceramic layer 48 is typically from about 0.003 to about 0.010 inch thick. Other operable ceramic materials may be used as well. When there is no ceramic layer 48 present, the protective layer 46 is termed an "environmental coating". When there is a ceramic layer 48 present, the protective layer 46 is termed a "bond coat".

Figure 3:
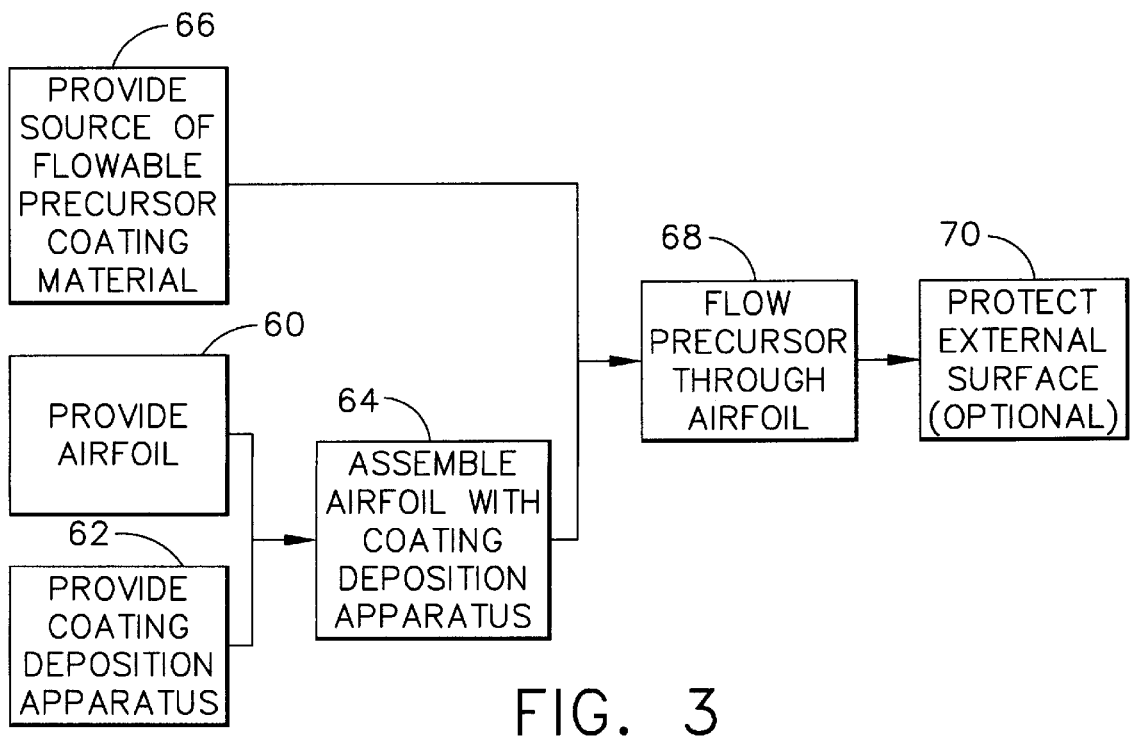
FIG. 3 is a block flow diagram of an approach for preparing a coated gas turbine airfoil.

FIG. 3 is a block diagram of an approach for practicing the present invention. An airfoil is provided, numeral 60. The airfoil is preferably the airfoil 22 of FIG. 1, either as a turbine blade or turbine vane. The airfoil (and all of the turbine blade or turbine vane) may be made of any operable base-metal alloy material, with a nickel-base superalloy being preferred. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

Figure 4:
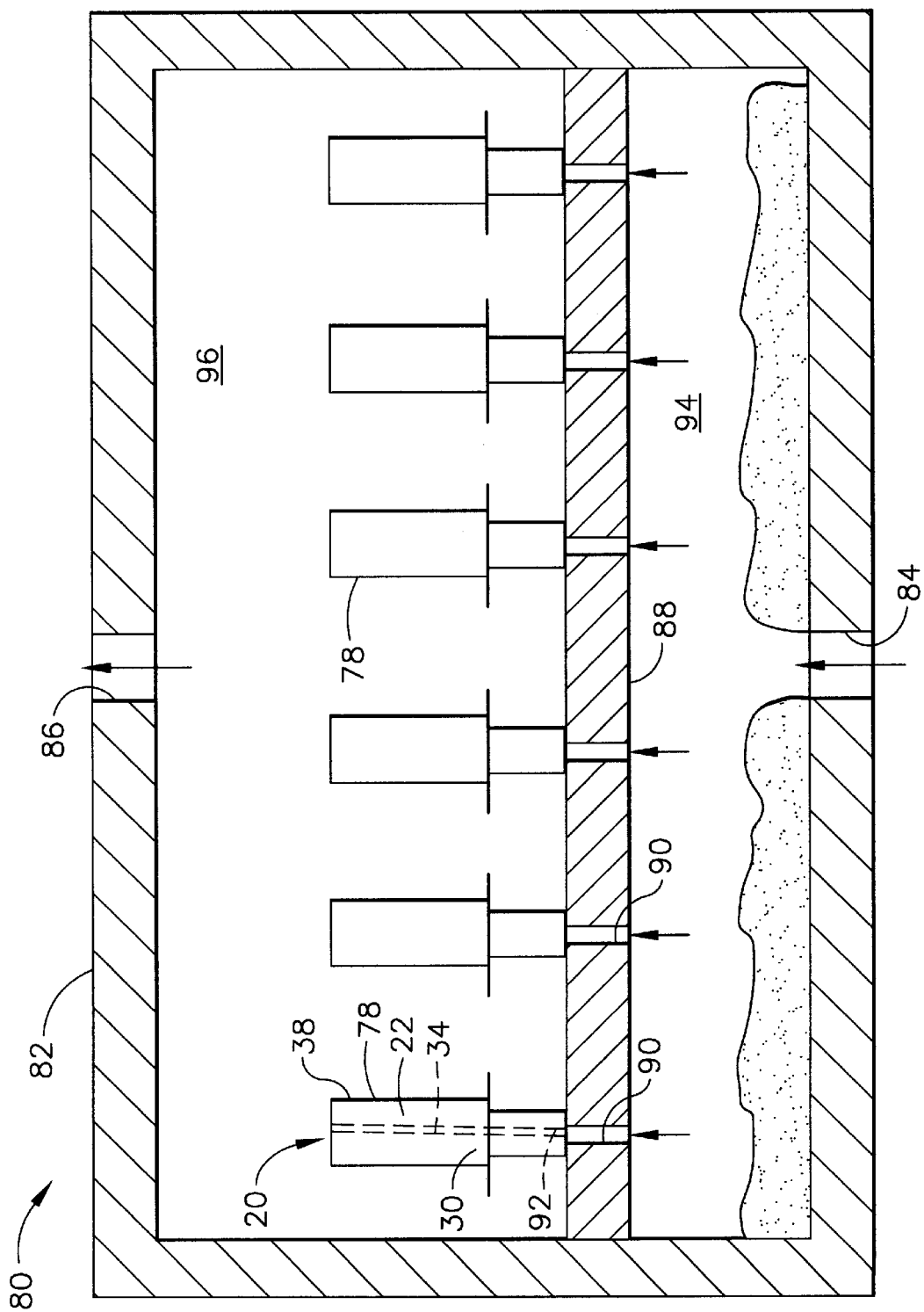
FIG. 4 is a schematic sectional view of a deposition apparatus for coating the internal passageways of gas turbine airfoils.

A coating deposition apparatus 80 is provided, numeral 62. A preferred form of the coating deposition apparatus 80 is illustrated in FIG. 4. The airfoil 22 is assembled together, numeral 64, with the coating deposition apparatus 80. The preferred coating deposition apparatus 80 of FIG. 4 includes a retort 82 having a retort inlet 84 and a retort outlet 86. A number of turbine blades 20 or turbine vanes are placed on a support 88 which is a solid barrier in the retort 82, except for a number of flow channels 90 therethrough. Each of the flow channels 90 is continuous with a precursor inlet end 92 of the internal passages 34 of the turbine blade 20. The precursor inlet end 92 is preferably near the root end 30 of the turbine blade 20. The support 88 divides the interior of the retort 82 into a source chamber 94 on one side of the support 88 and an outlet plenum 96 on the other side of the support 88. Gas can flow from the source chamber 94 to the outlet plenum 96 only by flowing through the flow channels 90 and the internal passages 34.

Optionally, a coating prevention structure 78 is provided to prevent coating of the modified diffusion aluminide onto the external airfoil surfaces 38, if it is desired that the modified diffusion aluminide not be present on the external airfoil surfaces 38. The coating prevention structure 78 may be of any operable type, and is illustrated as a maskant that overlies the portion of the surface that is not to have the modified diffusion aluminide coating. Maskants are known in the art.

In operation, aluminum and the modifying elements are first deposited onto the internal airfoil surface 36 by any operable technique, such as vapor phase aluminiding. A source of a flowable precursor coating material is provided, numeral 66. In one approach, the source of aluminum is preferably a gaseous source. A mixture of an aluminum-containing material (preferably aluminum metal, aluminum alloy, or aluminum-containing compound), a source of the modifying element, and a halide activator, preferably aluminum chloride, aluminum fluoride, or ammonium fluoride, are placed into the source chamber 94. The source of the modifying element is preferably an elemental powder containing the modifying element, or a decomposable compound containing the modifying element. The preferred source of aluminum is aluminum-titanium powder or chromium-aluminum chips. The preferred source of hafnium is hafnium chloride or elemental hafnium powder; the preferred source of yttrium is yttrium chloride; the preferred source of zirconium is elemental zirconium powder or zirconium chloride; the preferred source of chromium is elemental chromium powder; and the preferred source of silicon is elemental silicon powder. Mixtures of these sources of the modifying elements may be used to obtain mixtures of the modifying elements in the diffusion aluminide. The concentration of the modifying elements in the source gas may be controlled by the temperature of the precursor gas components and the temperature of deposition (due to the different activities of the constituents at different temperatures).

The activators and the halide gas containing the modifying elements contact the aluminum-containing material and the source of the modifying element to form the corresponding halide gas. Argon or hydrogen gas is flowed into the source chamber 94 portion of the retort 82 through the retort inlet 84, providing a carrier for the gaseous source of aluminum and the modifying element.

The resulting source gas flows through the flow channels 90 and thence through the internal passages 34 of the component article, numeral 68. Aluminum and the modifying elements are deposited onto the internal airfoil surface 36 along the length of each internal passage 34. The retort 82 is usually heated to a deposition reaction temperature of from about 1800° F. to about 2100° F. so that deposited aluminum atoms and atoms of the modifying elements interdiffuse into the substrate 42. An aluminum coating about 0.002 inch thick may be deposited in about 4–8 hours using this approach. Optionally, the heating may be continued after the flow of the source gas is discontinued, to achieve further interdiffusion.

Other operable approaches for introducing the source of aluminum into the internal passages 34 may also be used. Examples include chemical vapor deposition, slurry-coating processes, foam coating, organo-metallic chemical vapor deposition, pack cementation, and above-the-pack aluminiding.

After the aluminum coating step 68, the external surfaces 38 which were uncoated with aluminum in step 68 are optionally (but preferably) protected, numeral 70. In the preferred approach whose result is illustrated in FIG. 2, the overlay protective coating 44 is deposited overlying and contacting the external airfoil surface 38. The overlay protective coating 44 includes the protective layer 46 deposited onto the external airfoil surface 38. The protective layer 46 is preferably of the MCrAlX type discussed earlier. The protective layer 46 is deposited by any operable physical vapor deposition technique, such as sputtering, cathodic arc, electron beam, or plasma spray. No aluminum layer is deposited onto the external airfoil surface 38 as part of this step. The protective layer 46 is preferably from about 0.001 to about 0.003 inch, most preferably about 0.002 inch, thick.

The overlay protective coating 44 optionally includes the ceramic layer 48, deposited overlying and contacting the protective layer 46. The ceramic layer 48 is preferably from about 0.003 to about 0.010 inch thick, most preferably about 0.005 inch thick. (FIG. 2 is not drawn to scale.) The ceramic layer 48 is preferably yttria-stabilized zirconia, which is zirconium oxide containing from about 2 to about 12 weight percent, preferably from about 4 to about 8 weight percent, of yttrium oxide. Other operable ceramic materials may be used as well. It may be deposited by any operable technique, such as physical vapor deposition or plasma spray.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article comprising:
   a gas turbine component having
      a substrate,
      an internal passage through the substrate defining an internal surface of the substrate, and
      an external surface of the substrate; and
   an internal protective layer overlying the internal surface of the substrate, the internal protective layer having a composition comprising aluminum, plus, in weight percent, on average from about 0.1 to about 5.0 percent of a modifying element selected from the group consisting of hafnium, yttrium, zirconium, chromium, and silicon, and combinations thereof.

2. The article of claim 1, wherein the substrate has a shape of a gas turbine blade.

3. The article of claim 1, wherein the substrate has a shape of a gas turbine vane.

4. The article of claim 1, wherein the substrate is a nickel-base superalloy.

5. The article of claim 1, wherein the internal protective layer comprises from about 16 to about 30 weight percent aluminum, the modifying element, and other elements interdiffused from the substrate.

6. The article of claim 1, wherein the internal protective layer is from about 0.0005 inch to about 0.004 inch thick.

7. The article of claim 1, wherein the article further includes an external protective layer overlying the external surface of the substrate.

8. The article of claim 7, wherein the external protective layer is a diffusion aluminide.

9. The article of claim 7, wherein the external protective layer is an overlay.

10. The article of claim 7, wherein the external protective layer comprises an MCrAlX composition.

11. The article of claim 1, wherein the modifying element comprises hafnium.

12. The article of claim 1, wherein the modifying element comprises yttrium.

13. The article of claim 1, wherein the modifying element comprises zirconium.

14. The article of claim 1, wherein the modifying element comprises chromium.

15. The article of claim 1, wherein the modifying element comprises silicon.

16. A method for preparing an article, comprising the steps of providing a substrate having an internal passage therethrough defining an internal surface of the substrate;

depositing a layer onto the internal surface comprising aluminum and a modifying element selected from the group consisting of hafnium, yttrium, zirconium, chromium, and silicon, and combinations thereof; and heating the layer comprising aluminum and the modifying element so that the aluminum and the modifying element diffuse into the substrate to form an internal protective layer, the internal protective layer having an average composition of from about 16 to about 30 weight percent aluminum, from about 0.1 to about 5.0 weight percent of the modifying element, and other elements interdiffused from the substrate.

17. The method of claim 16, wherein the step of heating is performed at least in part simultaneously with the step of depositing.

18. The method of claim 16, wherein the step of heating includes the step of heating to a temperature of from about 1800° F., to about 2100° F., for a time of from about 4 hours to about 20 hours.

19. The method of claim 16, wherein the step of depositing includes the step of depositing the layer using a method selected from the group consisting of slurry coating, foam coating, chemical vapor deposition, organo-metallic chemical vapor deposition, pack cementation, and vapor phase aluminiding.

* * * * *